United States Patent Office 3,208,972
Patented Sept. 28, 1965

3,208,972
METHOD OF MAKING FINELY DIVIDED
MONOMETHYLSILOXANE
James D. Lyons, Midland, Mich., assignor to Dow Corning Corporation, Midland, Mich., a corporation of Michigan
No Drawing. Filed Sept. 20, 1962, Ser. No. 225,127
5 Claims. (Cl. 260—46.5)

This invention relates to a method for making a finely divided siloxane consisting essentially of the unit formula $CH_3SiO_{3/2}$ having a bulk density of less than about 0.6 g. per milliliter which comprises adding to water a silane selected from the group consisting of methyltrimethoxysilane and methyltriethoxysilane.

The product of this invention is useful, for example, in preparing alkali metal silanolates which are used to treat bricks, cement, etc., to render them water repellent.

Either pure or technical grade alkyltrialkoxysilanes can be used in preparing the siloxane according to the method of this invention. However, the method of this invention is particularly useful for the preparation of a siloxane of the type defined above from a technical grade alkyltrialkoxysilane.

In the production of an alkyltrialkoxysilane by the reaction of an alkyltrihalosilane and an alcohol, there remains in the product some unreacted halogen atoms on the silane. If such a technical grade alkyltrialkoxysilane is hydrolyzed to produce a siloxane, the unreacted halogen atoms present also undergo hydrolysis forming an acid, hydrochloric acid in the case of chlorine atoms, and a hard product is obtained which sticks to the sides of the reaction vessel in which the hydrolysis is carried out. Such a product is obviously undesirable and virtually useless for preparing silanolates.

The finely divided siloxane obtained by the process of this invention can readily be digested with caustic to produce an alkali metal silanolate according to well known methods.

It has been discovered in accordance with the present invention that if the hydrolysis of the alkyltrialkoxysilane is carried out in water which contains an alkaline substance having a basic dissociation constant $K_B$ which is at least $1.8 \times 10^{-5}$ at 25° C., in an amount sufficient to give the water a pH above 7, a finely divided siloxane consisting essentially of the unit formula $CH_3SiO_{3/2}$ and having a bulk density of less than about 0.6 g. per milliliter is obtained. At least 6 mols of water per mol of silane should be employed in making the siloxane.

Illustrative of the alkaline substances which may be employed in the process of this invention are the alkali metal hydroxides such as sodium, potassium, lithium and cesium hydroxide; ammonium hydroxide; sodium carbonate; the alkali metal phosphates such as trisodium phosphate, tripotassium phosphate, sodium tripolyphosphate and tetrapotassium pyrophosphate; the alkylamines such as methylamine, dimethylamine and trimethylamine; guanidine; the alkanol amines such as monoethanolamine, diethanolamine and triethanolamine; the quaternary ammonium hydroxides such as tetramethylammonium hydroxide and trimethylbenzylammonium hydroxide; and the alkylenepolyamines such as ethylenediamine, diethylenetriamine and triethylenetetraamine. In short, any water-soluble alkaline substance which has a basic dissociation $K_B$ which is at least $1.8 \times 10^{-5}$ at 25° C. may be employed. The amount of the alkaline substance employed should be sufficient to keep the water alkaline, that is, to give the water a pH above 7.

The silanes that are useful in preparing the siloxane according to this invention are methyltrimethoxysilane and methyltriethoxysilane.

While cooling the solutions may be desirable in some instances, for example, to remove the heat of solution from dissolving sodium hydroxide or to remove the heat from the exothermic hydrolysis of the silane, cooling is not necessarily essential to the process.

If it is desired to ship the product the siloxane may be dried, for example by centrifuging, to obtain a material which is 75 to 85 percent $CH_3SiO_{3/2}$ solids in water. Such a high solids content product is obviously desirable for shipping purposes.

Other materials which may be used and other modifications of the method which are within the scope of the invention will be obvious to those skilled in the art.

The following examples are set forth as being illustrative of the invention and should not be construed as limiting thereto.

*Example 1*

2840.0 g. of water were added to a reaction vessel and heated to 82° C. Then 1020.0 g. of methyltrimethoxysilane, $CH_3Si(OCH_3)_3$, containing 0.825 percent residual hydrolyzable chlorine was added to the water with agitation. The resultant product was hard and stuck to the sides of the reaction vessel and agitator. Such a product is very undesirable and virtually useless for preparing silanolates.

*Example 2*

245.0 g. of water containing enough sodium hydroxide to give the water a pH of about 8 (as measured by alkacid paper) was added to a reaction vessel. Then 136.0 g. of methyltrimethoxysilane were added to the water with agitation. The resultant product was a finely divided siloxane of the desired particle size.

*Example 3*

1840.0 g. of water and 9.7 g. of sodium hydroxide were added to a reaction vessel with agitation and cooling. Then 1020.0 g. of methyltrimethoxysilane, containing 0.825 percent residual hydrolyzable chlorine, was added to the water with agitation. The resultant product was a finely divided siloxane of the desired particle size, that is, it had a bulk density of 0.357 g. per milliliter.

*Example 4*

369.0 g. of water and 23.0 g. of a 5 percent solution in water of lithium hydroxide (1.14 g. LiOH) were added to a reaction vessel and agitated. Then 204.0 g. of methyltrimethoxysilane, containing 0.825 percent residual hydrolyzable chlorine, was added to the water with agitation. The resultant product was a siloxane of the desired particle size.

*Example 5*

369.0 g. water and 16.5 g. of a 7 percent solution in water of ammonium hydroxide (1.14 g. $NH_4OH$) were added to a reaction vessel with agitation. Then 204.0 g. of methyltrimethoxysilane, containing 0.825 percent residual hydrolyzable chlorine, was added to the water with agitation. The resultant product was a siloxane of the desired particle size, that is, it had a bulk density of 0.516 g. per milliliter.

*Example 6*

202.5 g. of water and 1.96 g. of sodium hydroxide were added to a reaction vessel with agitation. Then 204.0 g. of methyltrimethoxysilane, containing 0.825 percent residual hydrolyzable chlorine, was added to the water with agitation. The product obtained was of the desired particle size.

*Example 7*

40.5 g. of water and 1.96 of sodium hydroxide were added to a reaction vessel with agitation. Then 204.0 g. of methyltrimethoxysilane, containing 0.825 percent residual hydrolyzable chlorine, was added to the water with agitation. The product obtained was a hard gel which did not have the desired particle size. In this example, less than 6 mols of water per mol of silane were used.

*Example 8*

369.0 g. of water and 2.9 g. of monoethanolamine were added to a reaction vessel with agitation and cooling. Then 204.0 g. of methyltrimethoxysilane, containing 0.825 percent residual hydrolyzable chlorine, was added to the water with agitation. The product obtained was of the desired particle size.

*Example 9*

369.0 g. of water and 2.04 g. of sodium hydroxide were added to a reaction vessel with agitation. Then 225.0 g. of ethyltrimethoxysilane containing 0.800 percent hydrochloric acid was added to the water with agitation. A hard gel which stuck to the sides of the reaction vessel was obtained. The product did not have the desired particle size.

*Example 10*

369.0 g. of water and 4.43 g. of aniline were added to a reaction vessel with agitation. Then 204.0 g. of methyltrimethoxysilane, containing 0.825 percent residual hydrolyzable chlorine, was added to the water with agitation. No gel was obtained. An additional 9.5 g. of aniline were added to the solution with agitation. Upon standing a resin layer settled from the solution, but the desired siloxane gel was not obtained.

*Example 11*

125.0 g. of water and 13.0 g. of aniline were added to a reaction vessel with agitation. Then 50.0 g. of methyltrimethoxysilane, containing 0.825 percent residual hydrolyzable chlorine, was added to the water with agitation. The product did not gel and the desired product was not obtained.

*Example 12*

When 1335.0 g. of methyltriethoxysilane is used instead of the methyltrimethoxysilane in the process of Example 3, a product having the desired particle size is obtained.

*Example 13*

When 267.0 g. of methyltriethoxysilane is used instead of the methyltrimethoxysilane in the process of Example 4, a product having the desired particle size is obtained.

That which is claimed is:

1. A method for making a siloxane consisting essentially of the unit formula $CH_3SiO_{3/2}$ having a bulk density of less than about 0.6 g. per milliliter which comprises adding to water, with agitation, a silane selected from the group consisting of methyltrimethoxysilane and methyltriethoxysilane, said water containing a water soluble alkaline substance having a basic dissociation constant $K_B$ which is at least $1.8 \times 10^{-5}$ at 25° C. in an amount sufficient to give the water a pH above 7, there being employed at least 6 mols of water per mol of silane.

2. The method of claim 1 wherein the silane is methyltrimethoxysilane.

3. The method of claim 1 wherein the silane is methyltriethoxysilane.

4. The method of claim 1 wherein the alkaline substance is sodium hydroxide.

5. The method of claim 1 wherein the silane is methyltrimethoxysilane and the alkaline substance is sodium hydroxide.

References Cited by the Examiner

UNITED STATES PATENTS

| | | | |
|---|---|---|---|
| 2,571,533 | 10/51 | Britton et al. | 260—46.5 |
| 2,759,007 | 8/56 | Dunham et al. | 260—46.5 |
| 3,015,645 | 1/62 | Tyler | 260—46.5 |
| 3,057,822 | 10/62 | Rust et al. | 260—46.5 |

FOREIGN PATENTS

| | | |
|---|---|---|
| 500,159 | 2/54 | Canada. |

OTHER REFERENCES

Eaborn, Organosilicon Compounds, published by Academic Press, Inc. (New York), 1960, p. 301 relied upon.

LEON J. BERCOVITZ, *Prmary Examiner.*

WILLIAM H. SHORT, MURRAY TILLMAN, *Examiners.*